United States Patent Office 2,921,077
Patented Jan. 12, 1960

2,921,077

2-METHYL-6-CARBALKOXY-N-ALKYLAMINO-ACYLANILIDES

Rudolf Hiltmann, Fritz Mietzsch, and Wolfgang Wirth, Wuppertal-Elberfeld, Germany, assignors to Schenley Industries, Inc., New York, N.Y., a corporation of Delaware No Drawing. Application September 19, 1956
Serial No. 610,728

Claims priority, application Germany September 26, 1955

9 Claims. (Cl. 260—294.3)

This invention relates to and has as its object the production of novel 2 - methyl - 6 - carbalkoxy-N-alkylaminoacylanilides, which have been found to constitute excellent local anesthetics of very low toxicity and rapid activity.

The novel 2 - methyl - 6-carbalkoxy-N-alkylaminoacylanilides in accordance with the invention have the general formula:

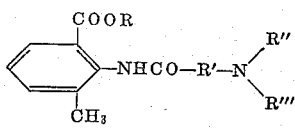

in which R represents a methyl or ethyl radical, R' a straight or branched chain alkylene radical having from 1 to 3 carbon radicals, R'' a lower alkyl radical, and R''' hydrogen or a lower alkyl radical. Furthermore, R'' and R''' may, together with the nitrogen atom to which they are attached, form a heterocyclic ring, such as a piperidino or pyrrolidino ring.

The new alkylaminoacylanilides in accordance with the invention may be used in the form of the free base or in the form of their salts, as, for example, the hydrochloride salt.

The novel compounds, in accordance with the invention, are distinguished from the known alkylaminoacylanilides by their excellent local tolerability and their surprisingly rapid onset of action. The alkylaminoacylanilides, in accordance with the invention, thus have a much better local tolerability than the known poor local tolerability of 4 - carbomethoxy - 3 - hydroxy-N-diethylaminoacetanilide. As compared with the known 2,6-dimethyl-N-diethylaminoacetanilide, the compounds in accordance with the invention have much better general tolerability and much less effect upon the circulation while being equal in anesthetic effect and rapidity of onset of action. Experiments on the seminal vesicle of rats has shown that the 6-carbomethoxy-2-methyl-N-diethylaminoacetanilide in accordance with the invention exercises less adrenolytic activity than the 2,6-dimethyl-N-diethylaminoacetanilide.

The 2 - methyl-6-carbalkoxy-N-alkylaminoacylanilides in accordance with the invention may be prepared by reacting an appropriate ester of 2-amino-3-methylbenzoic acid or a salt of this ester, such as a hydrohalide, with a corresponding alkylaminoalkylcarboxylic acid or with a derivative of such an acid which is reactive on the carboxyl group, as, for example, its anhydride, its halides, or its amide. In the latter case, it is expedient to employ the hydrochloride of a corresponding 2-amino-3-methylbenzoic acid ester.

Alternately, the anilides, in accordance with the invention, may be prepared by reacting a 2-methyl-6-carbalkoxy-N-acylanilide, obtained in the conventional manner, which bears a reactive substituent, such as a halogen atom, an alkyloxy, aralkyloxy, or aryloxy group, or a double bond in the N-acyl group, which a correspondingly substituted primary or secondary amine or with a benzylalkylamine, and, by subsequently removing the benzyl group according to conventional procedures.

The compound in accordance with the invention may furthermore be produced by reacting a corresponding 2-methyl-6-carbalkoxy-N-aminoacylanilide, N-alkylaminoacylanilide, or N-benzylaminoacylanilides with a reactive ester, as, for example, the sulfuric acid, arylsulfonic or alkylsulfonic, hydrohalic acid ester of a corresponding lower aliphatic alcohol, suitably in the presence of an alkaline condensing agent and by subsequently splitting off the benzyl radical, if necessary.

Finally, it is also possible to use the free acid in place of the methyl or ethyl 2-amino-3-methylbenzoate or the aforementioned N-acyl derivatives of these esters and to effect the esterification intermediately or at the end of the reaction.

The novel 2-methyl-6-carbalkoxy-N-alkylaminoacylanilides in accordance with the invention are colorless, crystallized, or oleaginous substances, which may be distillable in vacuo and readily form water-soluble salts with mineral acids or organic acids, in which form the same are excellently suited for injection.

The following examples are given by way of illustration and not limitation:

Example 1

Sixteen and five-tenths grams of 3-methyl-2-amino-methylbenzoate is dissolved in 80 cc. of glacial acetic acid. The solution is cooled to 10° C. and 12 g. of chloroacetyl chloride is added at once, causing the reaction mixture to heat up. When the reaction is over, the reaction mixture is stirred up with 200 cc. of an aqueous 20% solution of anhydrous sodium acetate. Vacuum-filtration and drying then yield 21.8 g. of 2-carbomethoxy-6-methyl-N-chloroacetanilide, which melts at 86.0–87.5° after reprecipitation from an ethyl acetate-ligroin mixture. Sixteen g. of this N-chloroacetanilide is suspended in 100 cc. of dry benzene. This is boiled under reflux for 5 hours following the addition of 10 g. of diethylamine; after cooling, the precipitated diethylamine hydrochloride is filtered off by suction. The benzene solution is extracted with an approximately twice-normal hydrochloric acid, and the base is precipitated from the hydrochloric acid solution by means of potassium carbonate solution. It is taken up with ether and dried over potassium carbonate. Following elimination of the solvent, the residue is distilled in vacuo, yielding 12 g. of 2 - methyl - 6 - carbomethoxy-N-diethylaminoacetanilide of B.P.$_5$ 190–192°. The hydrochloride melts at 139.0–140.5°.

Example 2

Ten grams of 3-methyl-2-amino-methylbenzoate and 5 g. of ethyl N-diethylaminoacetate are heated to 150–160° C. for 20 hours. After cooling, the mixture is taken up with potassium carbonate solution and ether; the ether solution is separated and extracted with approximately 2-N-hydrochloric acid. The base is precipitated from the hydrochloric acid solution by means of potassium carbonate solution. It is then absorbed in ether and dried with potassium carbonate. Following elimination of the solvent, the residue is distilled in vacuo, and the 2-methyl-6-carbomethoxy-N-diethylaminoacetanilide of B.P.$_5$ 190–193° described in Example 1 is obtained. The melting point of the hydrochloride is 139.0–140.5°.

Example 3

Proceeding in an analogous manner to Example 1, there are obtained:

(a) 2 - methyl - 6 - carbomethoxy - (1' - piperidino) - acetanilide of the boiling point 215–17° C./5 mm. Hg from 2 - methyl - 6 - carbomethoxy - chloroacetanilide and piperidine. Its hydrochloride has a melting point of 182–184° C.;

(b) 2 - methyl - 6 - carbomethoxy - (1' - pyrrolidino) - acetanilide of the boiling point 203–205° C./5 mm. Hg from 2 - methyl - 6 - carbomethoxy - chloroacetanilide and pyrrolidine. Its hydrochloride has a melting point of 164–165° C.;

(c) 2 - methyl - 6 - carbomethoxy - N - n - butylamino-acetanilide of the boiling point 210–212° C./5 mm. Hg from 2 - methyl - 6 - carbomethoxy - chloroacetanilide and n-butylamine. Its di-phosphate has a melting point of 148–149.5° C.

Example 4

Thirty-eight and five-tenths grams of β-chloro-propion-ylchloride are added dropwise to a solution of 50 grams of 2-amino-3-methyl-benzoic acid methyl ester in 200 ml. of trichloro-ethylene with cooling at 0–5° C., and the solution is heated to a boil until the evolution of hydrochloric acid ceases. In order to remove the residual hydrochloric acid, the solution is boiled for another 30 minutes while passing in nitrogen. After cooling to room temperature, 45 g. of diethylamine are added dropwise, and the solution is then refluxed for 3 hours. The cooled reaction mixture is shaken out first with water and then with 200 ml. of about 2-N-hydrochloric acid. After separating off the trichloro-ethylene layer, the base is precipitated from the aqueous solution with potassium carbonate solution, taken up in ether, and the ethereal solution dried with potassium carbonate. After distilling off the solvent, 60 g. of a yellow oil results, which is dissolved in 250 ml. of dry acetone. After treating the solution with active carbon, the base is neutralized with about 20% absolute alcoholic hydrochloric acid and treated with dry ether in a quantity, so as to prevent a lasting turbidity. After standing for some time, the hydrochloride of 2-methyl-6-carbomethoxy-β-N-diethylamino-propionic acid anilide crystallizes. Its melting point is 90–92° C. after recrystallizing from acetone and ether. The yield is 50 grams.

Example 5

Fifty-two grams of α-bromo-propionic acid chloride are added dropwise to a solution of 50 g. of 2-amino-3-methyl-benzoic acid methylester in 200 ml. of trichloro-ethylene while cooling at 0–5° C., and the solution is then heated to the boil until the evolution of hydrochloric acid ceases. In order to remove the residual hydrochloric acid, the solution is heated for another 30 minutes while nitrogen is passed in. After cooling to room temperature, 45 g. of diethylamine are added dropwise and the solution is then refluxed for 3 hours. The reaction mixture formed is shaken out first with water and then with 200 ml. of about 2-N-hydrochloric acid. After separating off the trichloroethylene layer, the base is precipitated from the aqueous hydrochloric acid solution with potassium carbonate solution, taken up in ether, and the ethereal solution dried with potassium carbonate. After distilling off the solution, the residue is distilled in vacuo and 75 g. of 2-methyl - 6 - carbomethoxy - α - N - diethyl - amino - propionic acid anilide of the B.P. 172–174° C./0.2 mm. Hg are obtained. Its hydrochloride has a melting point of 166–167° C.

In analogous manner, 47.8 g. of 2-methyl-6-carbomethoxy - α - N - diethylamino - butyric acid anilide of the B.P. 172° C./0.6 mm. Hg are obtained from 50 g. of 2-amino-3-methyl-benzoic acid methylester and 56.2 g. of α-bromo-butyric acid chloride. Its hydrochloride has a melting point of 181° C.

Example 6

Forty grams of 2-amino-3-methyl benzoic acid are dissolved in 240 ml. of alcohol, and hydrogen chloride is passed in until the solution is saturated. The mixture is refluxed for 4 hours and then evaporated to dryness. The finely pulverized residue is suspended in 125 ml. of benzene. After addition of 125 ml. of saturated sodium acetate solution, 37 g. of chloro-acetylchloride are added dropwise at 0–5° C., and the solution is stirred at room temperature for another hour. The undissolved residue is filtered off with suction, the two layers are separated, the benzene layer is washed with 10% potassium carbonate solution and water, and then dried with calcium chloride. After distilling off the solvent, the residue is distilled in vacuo, 15 g. of 2-methyl-6-carboethoxy-chloro-aceto anilide being obtained. B.P. 178–180° C./5 mm. Hg. It has a melting point of 65–67° C.

Twelve and eight-tenths grams of this chloroaceto anilide are dissolved in 125 ml. of benzene and heated to the boil for 3 hours after adding 7.5 g. of diethylamine. The solution is worked up as described in Example 1. Eleven and five-tenths grams of 2-methyl-6-carboethoxy-N-diethyl-amino-acetoanilide of the B.P. 176–178° C./5 mm. Hg are obtained. Its hydrochloride has a melting point of 142–143.5° C.

We claim:

1. 2 - methyl - 6 - carbomethoxy - β - N - diethylamino-propionic acid anilide.
2. 2 - methyl - 6 - carbomethoxy - α - N - diethylamino-propionic acid anilide.
3. 2 - methyl - 6 - carbomethoxy - α - N - diethylamino-butyric acid anilide.
4. 2 - methyl - 6 - carbomethoxy - N - diethylamino-acetanilide.
5. 2 - methyl - 6 - carbomethoxy - (1' - piperidino) - acetanilide.
6. 2 - methyl - 6 - carbomethoxy - (1' - pyrrolidino) - acetanilide.
7. 2 - methyl - 6 - carbomethoxy - N - n - butylamino-acetanilide.
8. 2 - methyl - 6 - carboethoxy - N - diethylamino-acetanilide.
9. A member selected from the group consisting of 2-methyl - 6 - carbalkoxy - N - alkylaminoacylanilides having the general formula

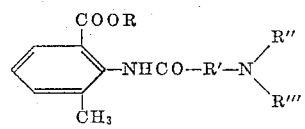

in which R is a member selected from the group consisting of methyl and ethyl radicals, R' is an alkylene radical having from 1 to 3 carbon atoms, R" is a lower alkyl radical, R'" is a member selected from the group consisting of hydrogen and lower alkyl radicals and further members, wherein

forms a heterocyclic ring selected from the group of piperidino and pyrrolidino rings and the non-toxic acid addition salts of said anilides.

References Cited in the file of this patent

UNITED STATES PATENTS

| | | |
|---|---|---|
| 619,549 | Einhorn | Feb. 14, 1899 |
| 2,657,210 | Clinton | Oct. 27, 1953 |

OTHER REFERENCES

Sakera et al.: Experientia, vol. 11, pp. 275–276 (1955).
Sanna: Chemical Abstracts, vol. 30, p. 5722⁹ (1936).